(12) United States Patent
Samaniego

(10) Patent No.: US 8,212,710 B2
(45) Date of Patent: Jul. 3, 2012

(54) RADAR IMAGE GENERATION SYSTEM

(75) Inventor: Raymond Samaniego, Prosper, TX (US)

(73) Assignee: Raytheon Company, Waltham, MA (US)

( * ) Notice: Subject to any disclaimer, the term of this patent is extended or adjusted under 35 U.S.C. 154(b) by 430 days.

(21) Appl. No.: 12/607,616

(22) Filed: Oct. 28, 2009

(65) Prior Publication Data

US 2012/0068875 A1    Mar. 22, 2012

Related U.S. Application Data

(60) Provisional application No. 61/198,274, filed on Oct. 31, 2008.

(51) Int. Cl.
*G01S 13/00* (2006.01)

(52) U.S. Cl. .......................................... 342/22; 342/200

(58) Field of Classification Search .................... 342/22
See application file for complete search history.

(56) References Cited

U.S. PATENT DOCUMENTS

| | | | |
|---|---|---|---|
| 5,446,461 A * | 8/1995 | Frazier | ............. 342/22 |
| 5,488,373 A | 1/1996 | Hellsten | |
| 5,923,278 A | 7/1999 | Poehler et al. | |
| 5,945,937 A | 8/1999 | Fujimura | |
| 5,969,662 A | 10/1999 | Hellsten | |
| 6,384,766 B1 | 5/2002 | Ulander | |
| 6,426,718 B1 | 7/2002 | Ridgway | |
| 6,441,772 B1 | 8/2002 | Hellsten et al. | |
| 6,583,751 B1 | 6/2003 | Ferretti et al. | |
| 6,801,155 B2 | 10/2004 | Jahangir et al. | |
| 6,864,828 B1 | 3/2005 | Golubiewski et al. | |
| 6,982,666 B2 | 1/2006 | Temes et al. | |
| 7,215,277 B2 | 5/2007 | Woodford et al. | |
| 7,391,357 B1 | 6/2008 | Doerry et al. | |
| 7,561,096 B2 | 7/2009 | Hellsten | |
| 7,567,198 B2 | 7/2009 | Smith | |
| 2002/0175850 A1 | 11/2002 | Barnes et al. | |
| 2003/0076254 A1 | 4/2003 | Witten | |
| 2004/0021598 A1 | 2/2004 | Garren | |
| 2006/0226837 A1 | 10/2006 | Epstein | |
| 2007/0159376 A1 | 7/2007 | Abatzoglou et al. | |
| 2007/0247461 A1 | 10/2007 | Smith | |
| 2009/0021423 A1 | 1/2009 | Cheng et al. | |
| 2009/0027050 A1 | 1/2009 | Garwood et al. | |

FOREIGN PATENT DOCUMENTS

WO    WO 2008/001092    1/2008

OTHER PUBLICATIONS

European Search Report; Application No: 09174534.9-1248 / 2182385; 5 pages, Oct. 7, 2011.

* cited by examiner

*Primary Examiner* — Timothy A Brainard

(74) *Attorney, Agent, or Firm* — Christie, Parker & Hale, LLP

(57) ABSTRACT

According to one embodiment, a synthetic aperture radar includes a back projection processor that is configured to receive multiple return signals from the radar as the radar is moved with respect to an object, wherein the return signals are representative of electro-magnetic radiation reflected from the object. The back projection processor generates a dynamic image of one or more internal features of the object from the return signals by varying a squint angle of the plurality of return signals in which the squint angle varied by modifying a back projection filter. Once generated, the back projection processor displays the dynamic image on a display.

21 Claims, 5 Drawing Sheets

RADAR IMAGE GENERATION SYSTEM

RELATED APPLICATIONS

This application claims priority to U.S. Provisional Patent Application Ser. No. 61/198,274, entitled "RADAR IMAGE GENERATION SYSTEM," which was filed on Oct. 31, 2008.

GOVERNMENT FUNDING

This invention was made with Government support via Contract HR0011-06-C-0111 awarded by DARPA Visibuilding Phase 1. The Government may have certain rights in this invention.

TECHNICAL FIELD OF THE DISCLOSURE

This disclosure generally relates to radars, and more particularly, to a radar image generation system and a method of using the same.

BACKGROUND OF THE DISCLOSURE

Synthetic aperture radar (SAR) is a radar signal processing technique used to form images of moving targets using radar signals. A two dimensional image can be formed by separating radar returns from an object in range and in doppler frequency. A synthetic aperture radar two-dimensional image is normally plotted as range verse azimuth. Differing doppler shifts in a received radar image may be produced by different points along a target that each have their own line of sight (LOS) velocities towards the radar. The range axis, however, may be relatively more accurate than doppler shifts in that it represents an apparent distance of the target from the radar.

SUMMARY OF THE DISCLOSURE

According to one embodiment, a synthetic aperture radar includes a back projection processor that is configured to receive multiple return signals from the radar as the radar is moved with respect to an object, wherein the return signals are representative of electro-magnetic radiation reflected from the object. The back projection processor generates a dynamic image of one or more internal features of the object from the return signals by varying a squint angle of the plurality of return signals in which the squint angle varied by modifying a back projection filter. Once generated, the back projection processor displays the dynamic image on a display.

Some embodiments of the disclosure may provide numerous technical advantages. For example, one embodiment of the radar image generation system may provide useful imagery of various internal characteristics of buildings with limited access to its proximate environment. Generation of imagery using synthetic aperture radar processing techniques is known. These techniques, however, require access to the buildings from several orthogonal viewing angles in order to provide imagery having sufficient detail. The radar image generation system provides a solution to this problem by implementing a processing technique that synthetically narrows and squints the beamwidth of the radiation pattern generated by its associated radar to update a portion of imagery generated. Thus, internal characteristics of targets, such as buildings may be ascertained with limited access to the targets.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

It should be understood at the outset that, although example implementations of embodiments are illustrated below, various embodiments may be implemented using any number of techniques, whether currently known or not. The present disclosure should in no way be limited to the example implementations, drawings, and techniques illustrated below. Additionally, the drawings are not necessarily drawn to scale.

Synthetic aperture radar (SAR) signal processing techniques use multiple radar return signals to generate imagery of targets. To acquire images having useful information, the radar antenna is moved in relation to the target. In some intelligence, surveillance, and reconnaissance (ISR) activities, it would be useful to generate imagery of buildings or other structures that may be situated in metropolitan or other civilian regions.

Although synthetic aperture radar techniques may provide useful imagery, access to these buildings may be relatively limited in some cases. For example, radars using synthetic aperture radar techniques may be relatively large and are therefore typically configured on stationary platforms or relatively large mobile platforms such as aircraft. Relatively close access may be provided by roadways proximate these buildings; however, many known radar implementations are too large to be configured on land-based vehicles that travel over these roadways.

Figure 1:
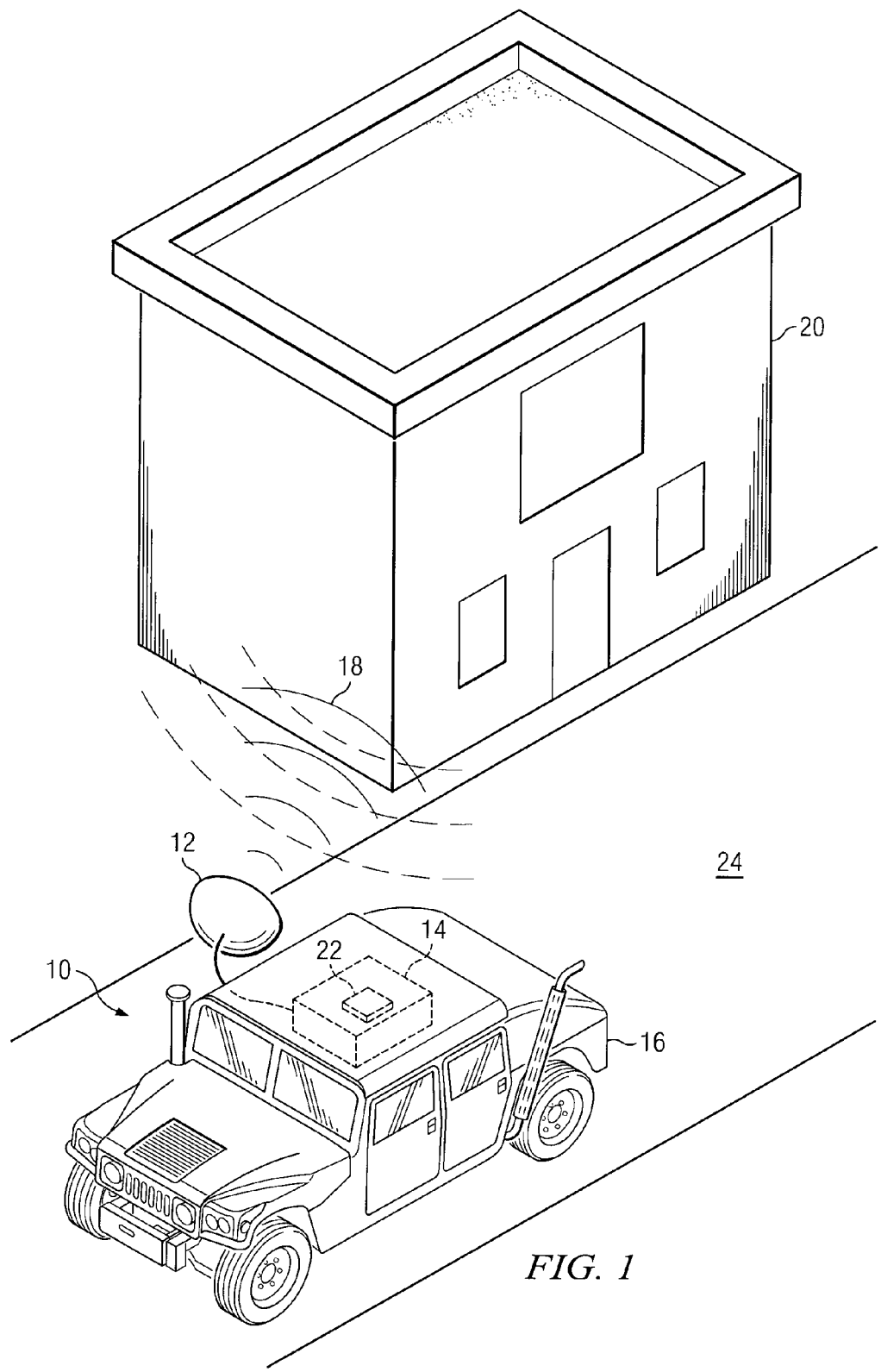
FIG. 1 shows one embodiment of a radar image generation system according to the teachings of the present disclosure.

FIG. 1 shows one embodiment of a radar image generation system 10 according to the teachings of the present disclosure. Radar image generation system 10 includes a radar 12 coupled to a computing system 14 and mounted on a mobile platform that, in this particular embodiment, is a truck 16. Radar 12 transmits electro-magnetic radiation 18 towards a building 20 and receives reflected electro-magnetic radiation 18 to generate return signals indicative of structural characteristics of a building 20. Computing system 14 executes a back-projection processor 22 that combines multiple return signals from radar 12 that have been received at varying angles to produce imagery of a building 20 or other object. As will be described in detail below, radar image generation system 10 may generate imagery of internal features inside of building 20 by varying a squint angle of the return signals using back projection processor 22.

In the particular embodiment shown, radar 12 is mounted on a truck 16 such that movement of truck 16 along a roadway 24 provides reflected electro-magnetic radiation 18 of building 20 at multiple angles. In other embodiments, radar 12 may be mounted on any suitable mobile platform for movement relative to a target of interest. For example, radar 12 may be configured on a floating barge to obtain information of various internal features of other floating vessels or ground-based structures situated near the water's shoreline. As another example, radar 12 may be configured on an aircraft, such as a helicopter that moves relative to building 20.

Radar 12 may be any suitable type of radar. In one embodiment, radar 12 generates image information by transmitting and receiving electro-magnetic energy over a range of frequencies. For example, radar 12 may generate image information using electro-magnetic radiation at frequencies ranging from 0.5 to 2.0 Giga-Hertz. Electro-magnetic radiation in this frequency range may provide sufficient penetration depth of structures, such as buildings to view their various internal characteristics, such as walls or other items of interest.

Radar 12 may include any type of antenna element that transmits and receives electro-magnetic energy at a frequency band suitable for producing synthetic aperture radar imagery. In one embodiment, radar 12 comprises a single horn antenna element that transmits and receives electro-magnetic radiation 18. A suitable antenna of this type may be approximately 1.5 feet long and have an aperture of approximately 1.0 foot by 1.0 foot. Certain embodiments incorporating a single horn antenna may provide an advantage in that it may be relatively cheaper than an active electronically scanned array (AESA) with comparable performance characteristics and may be concealed within a land-based vehicle, such as truck 16 for covertly obtaining information about internal features of structures, such as building 20.

Figure 2:
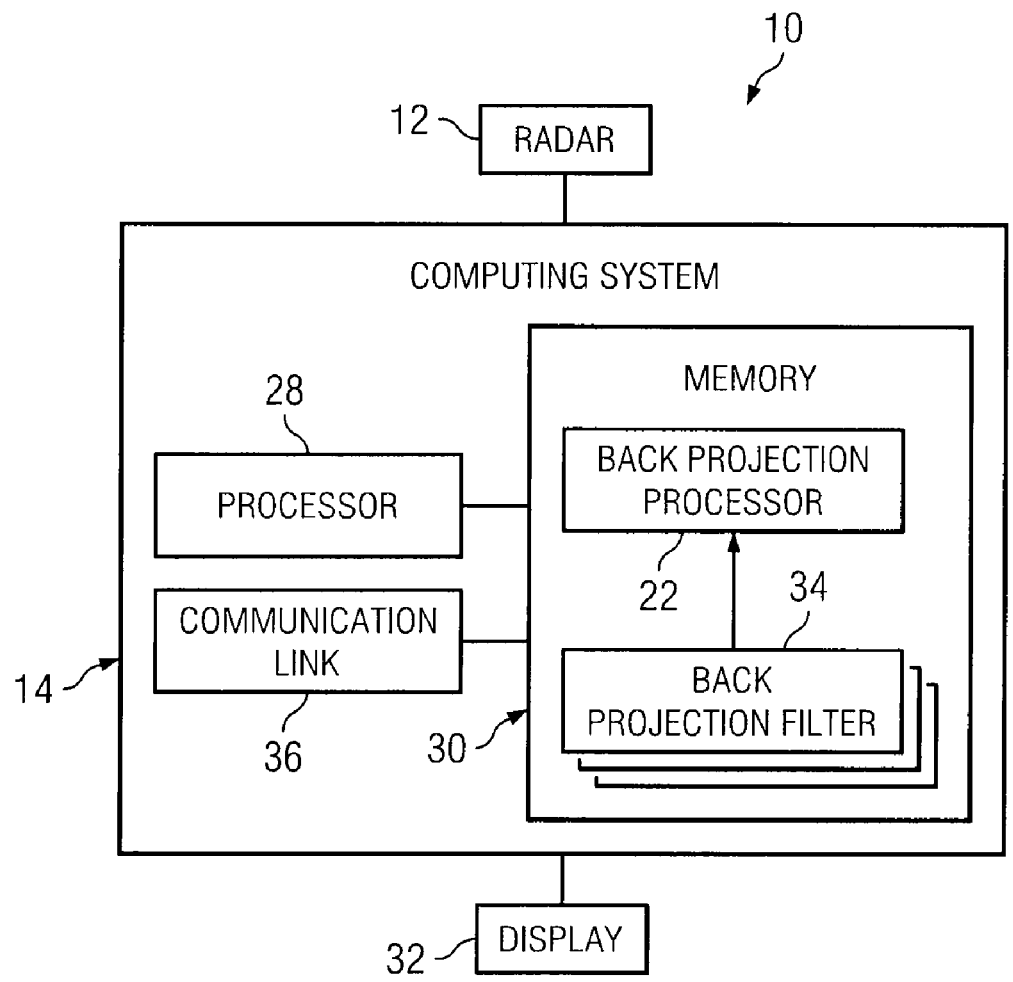
FIG. 2 is a diagram showing several components of the synthetic aperture radar of FIG. 1.

FIG. 2 is a diagram showing several components of the radar image generation system 10 of FIG. 1. Computing system 14 includes a processor 28, a memory 30, and a display 32 coupled as shown. Memory 30 stores back projection processor 22 and one or more back projection filters 34 that are stored in memory 30. Computing system 14 may also include a communication link 36 that may be used to communicate with other computing systems.

To generate imagery from return signals obtained from radar 12, back projection processor 22 uses one or more back projection filters 34 to generate imagery that may be displayed on display 32. Computing system 14 executes a back-projection processor 22 using a set of executable instructions stored in memory 30. Back projection processor 22 generates imagery using a back projection process wherein return signals from radar 12 are combined with previously received signals to form the imagery. Back projection processor 22 combines the return signals using back projection filters 34 that perform various algorithms on the return signals. In one embodiment, a particular back projection filter 34 may include a spatial filter that filters return signals against one another according to the position and orientation of radar 12 relative to information in the return signals. For example, several return signals may include relatively strong specular information indicating the presence of an internal feature of building 20. When combining these signals, back projection processor 22 may filter the received specular information according to known position and orientation changes of radar 12 relative to building 20.

In another embodiment, a back projection filter 34 may include a doppler filter that filters return signals against one another according to the doppler shift in the received energy in the signals. Combining return signals according to their relative doppler shifts may be useful for determining additional information about one or more internal features of building 20, such as materials from which the internal features of building 20 are made.

Back projection processor 22 may generate a dynamic image from multiple return signals by adjusting the one or more back projection filters 34 and visualizing the effects of these adjustments on display 32. That is, the dynamic image may include multiple images generated by back projection processor 22 at slightly different filtering levels of one or more back projection filters 34.

Certain embodiments of back projection processor 22 may provide an advantage in that its generated dynamic image may provide information about various internal features of building 20 that may be difficult to ascertain at only one filter level of a back projection filter 34. For example, building 20 may have walls that are oriented orthogonally relative to the path of radar 12. With this orientation, specular returns from other internal features that are not configured orthogonally may be significantly greater than return signals from orthogonally oriented walls, thus swamping their return signals. By adjusting back projection filters 34, the return signals may be squinted such that return signals from orthogonal walls may be amplified relative to other return signals.

Computing system 14 may be any suitable type. For example, computing system 14 may generally be adapted to execute any of the known OS2, UNIX, Mac-OS, Linux, and Windows Operating Systems or other operating systems. The computing system 14 in this embodiment comprises a processor 28, a memory 30, and one or more input/output devices such as display 32. In other embodiments, the computing system 14 may include more, less, or other component parts.

Several embodiments may include logic contained within a medium. Logic may include hardware, software, and/or other logic. Logic may be encoded in one or more tangible media and may perform operations when executed by a computer. Certain logic, such as the processor 28, may manage the operation of the computing system 14. Examples of the processor 28 include one or more microprocessors, one or more applications, and/or other logic. Certain logic may include a computer program, software, computer executable instructions, and/or instructions capable being executed by the computing system 14. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 30. The memory 30 may comprise one or more tangible, computer-readable, and/or computer-executable storage medium. Examples of the memory 30 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The communication link 36 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

Although the illustrated embodiment provides one embodiment of a computer that may be used with other embodiments, such other embodiments may additionally utilize computers other than general purpose computers as well as general purpose computers without conventional operating systems. Additionally, embodiments may also employ multiple computing systems 14 or other computers networked together in a computer network. For example, multiple computing systems 14 or other computers may be networked through the Internet and/or in a client server network. Embodiments may also be used with a combination of separate computer networks each linked together by a private or a public network.

Figure 3:
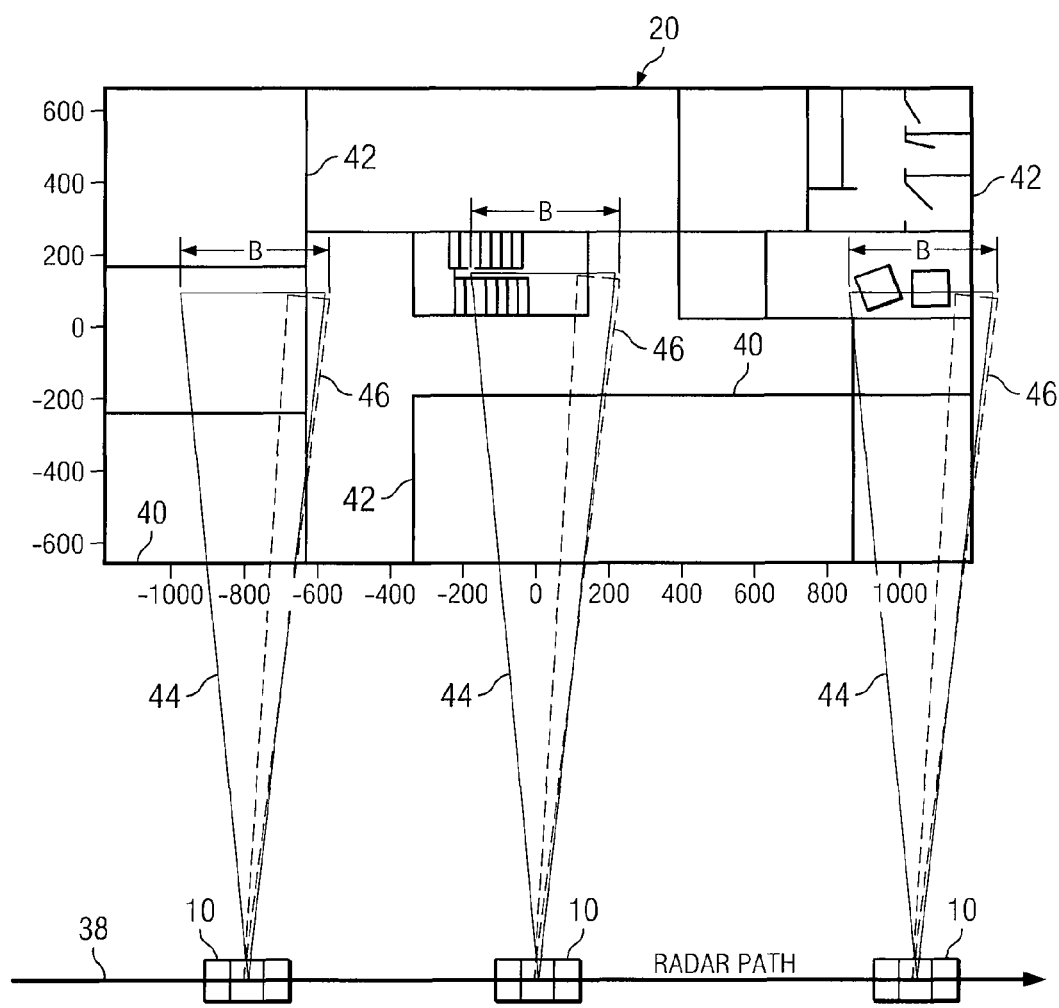
FIG. 3 is a diagram showing how radar image generation system of FIG. 1 may be used to acquire imagery of various internal characteristics of a building.
Figure 4A:
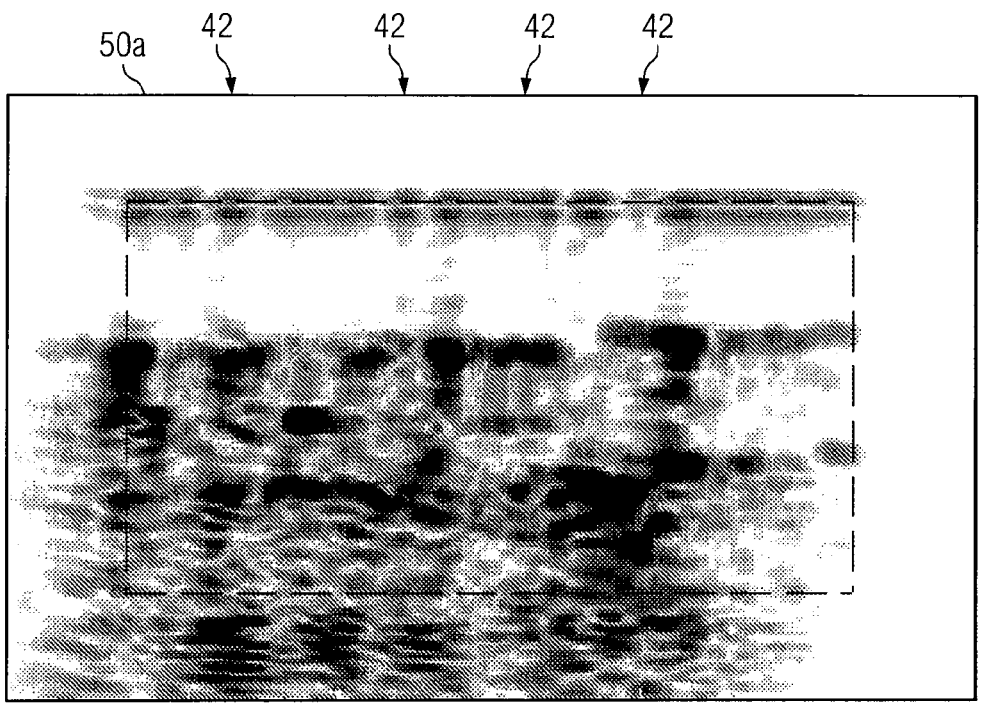
FIGS. 4A through 4D show several images of a dynamic image that may be generated by the synthetic aperture radar of FIG. 1 on its display.
Figure 4B:
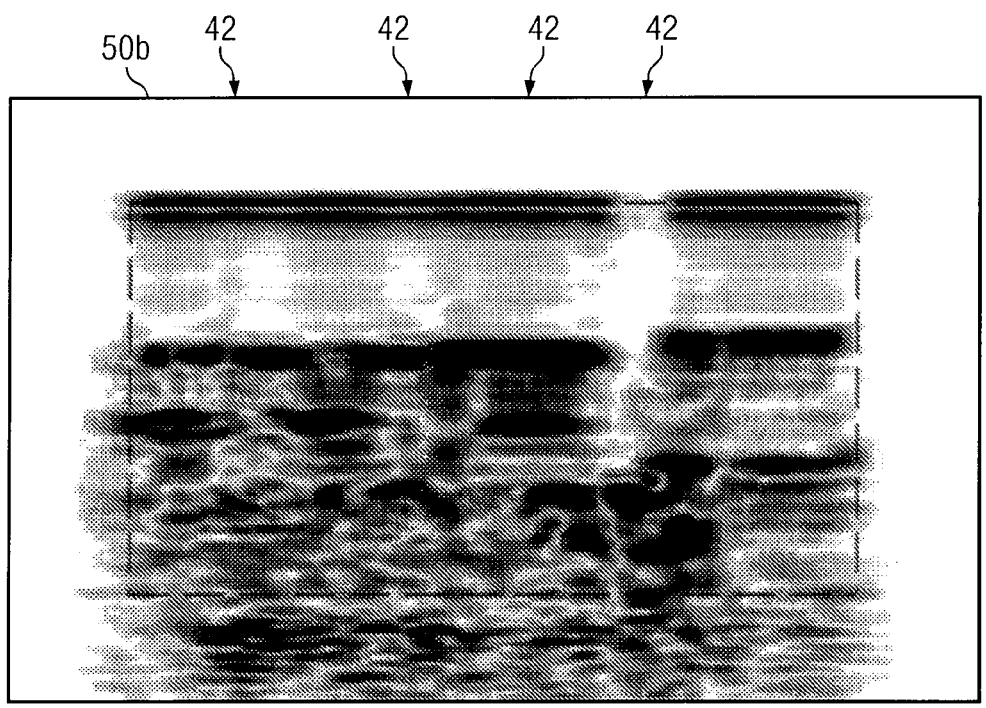
Figure 4C:
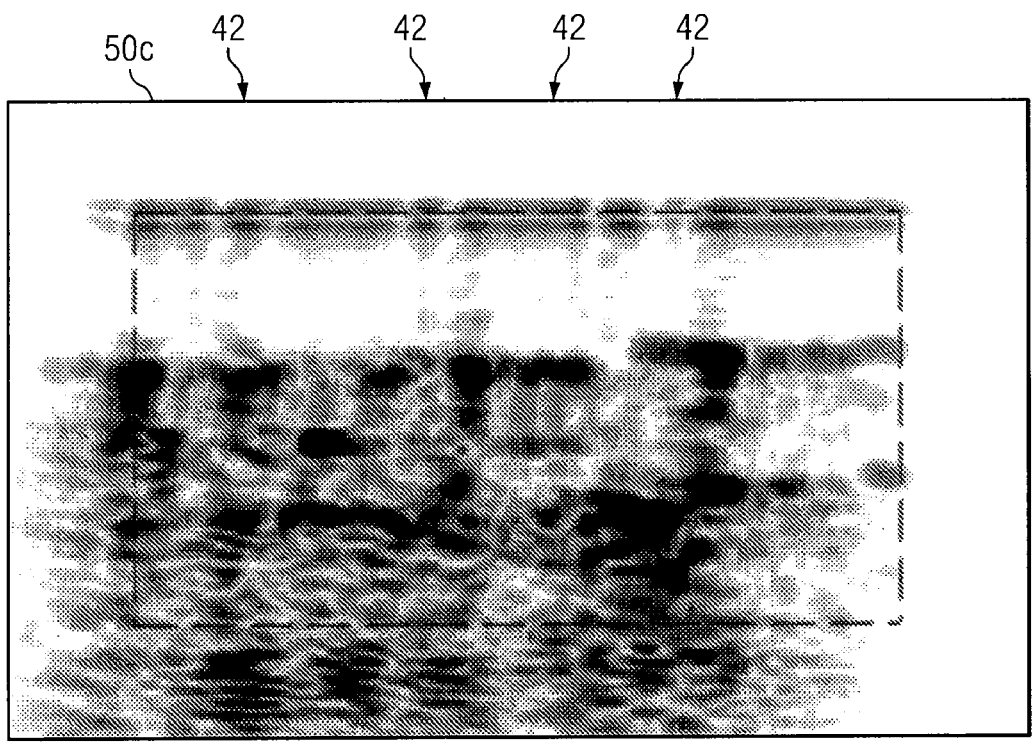
Figure 4D:
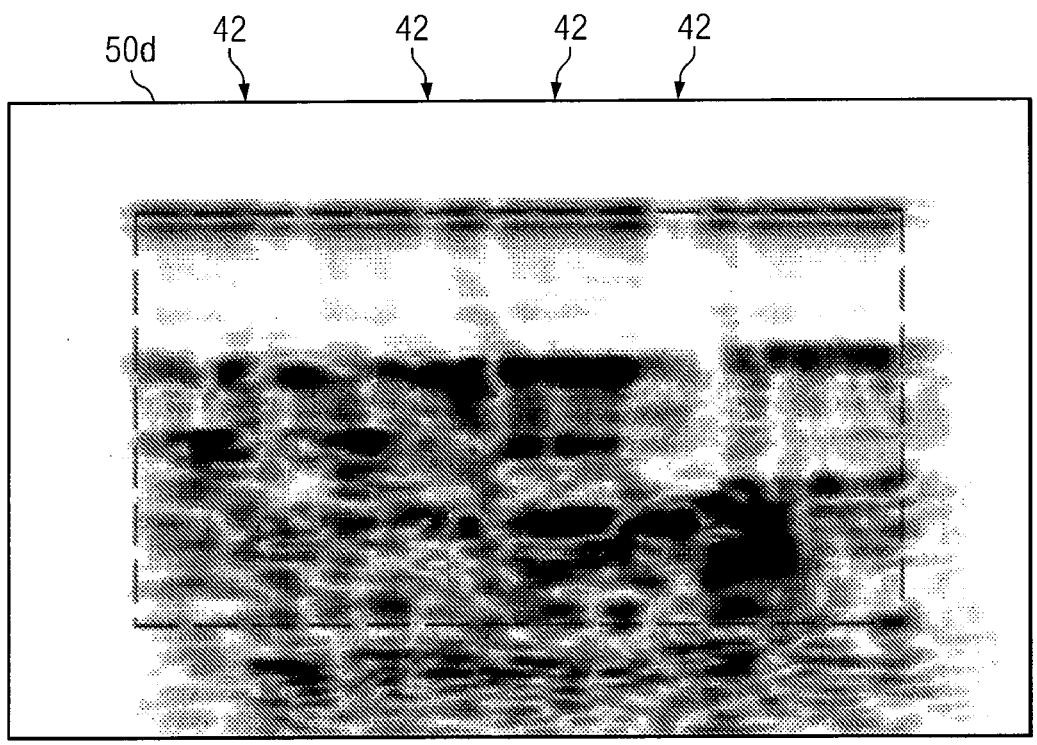

FIG. 3 is a diagram showing how radar image generation system 10 may be used to acquire imagery of various internal characteristics of building 20. Radar image generation system 10 travels along a path 38, which may be essentially similar to the path traveled by truck 16 along roadway 24 of FIG. 1. As shown, building 20 has parallel walls 40 and several orthogonal walls 42 that are generally perpendicular to radar image generation system 10 traveling along path 38. During movement, radar image generation system 10 generates a electro-magnetic radiation pattern 44 of electro-magnetic radiation 18 having a specified beamwidth B. Although three radiation patterns 44 are shown, each displays a representative illustration of an example radiation pattern 44 that may be generated by radar image generation system 10 as it traverses proximate to building 20 over a period of time.

Although electro-magnetic radiation in the range of 0.5 to 2.0 Giga-Hertz may be useful for penetrating through solid structures, such as the walls of a building, the beamwidth of such radiation patterns may be relatively wide compared with those of higher frequency ranges. Thus in one embodiment, back-projection processor 22 is configured to update imagery over a portion 46 of the beamwidth B produced by radar 12 by squinting the radiation pattern 44 using back projection filters 34. That is, the effective area of building 20 updated by back-projection processor 22 is a portion of the area within the overall beamwidth B produced by radar 12. In the particular embodiment shown, the portion 46 of beamwidth B processed by back-projection processor 22 may be used to determine the presence and/or location of orthogonal walls 42 of building 20 because the synthetic beam is squinted. Squinting radiation pattern 44 generally refers to the act of applying a phase shift gradient across the received radiation pattern 44.

During movement along path 38, computing system 14 receives signals from radar 12 indicative of reflected electro-magnetic radiation 18 from building 20 to generate imagery. Computing system 14 uses back-projection processor 22 to update the generated imagery by processing a portion 46 of beamwidth B of radar 12. During processing, the portion 46 or area of beamwidth B may be adjusted to detect anomalies in the generated imagery that may be indicative of structural characteristics such as orthogonal walls 42 of building 20. In one embodiment, back-projection processor 22 may include a spatial filter and/or a doppler filter that may each be independently adjusted to narrow or "squint" the beamwidth B of radiation pattern 44. In another embodiment, adjustment of the portion 46 of beamwidth B may be accomplished using radiation pattern 44 information stored in the memory 30 of computing system 14 or other suitable memory external to computing system 14. That is, the previously described process may be accomplished using a single pass of radar image generation system 10 across building 20.

Propagation of electro-magnetic radiation 18 through orthogonal walls 42 may be affected by several factors, such as the type of material used in their construction. For example, orthogonal walls 42 formed of concrete may have a different dielectric constant than other walls formed of plaster and/or drywall board. Because propagation delay of electro-magnetic radiation 18 may vary proportionally to the dielectric constants of varying materials, the construction of orthogonal walls 42 may affect the generation of imagery produced. Thus in one embodiment, the portion 46 of beamwidth B may be adjusted according to the type of materials used in construction of the building 20.

FIGS. 4A through 4D show several images 50 of a dynamic image that may be generated by the radar image generation system 10 of FIG. 1 on display 32. Each image shows an instantaneous rendering of multiple return signals processed by back projection processor 22 with a back projection filter 34 at differing filter levels. Image 50a of FIG. 4A for example, displays an instantaneous rendering of building 20 with a relatively large level of filtering by back projection filter 34, and image 50d of FIG. 4D displays an instantaneous rendering of building 20 with a relatively low level of filtering by back projection filter 34.

As can be seen, view of any one image 50 may not adequately reveal orthogonal walls 42 in the building 20. When viewed sequentially on display 32, however, transient anomalies of the rendered dynamic image may be viewed to provide visual detection of orthogonal walls 32 of building 20.

Modifications, additions, or omissions may be made to radar image generation system 10 without departing from the scope of the invention. The components of radar image generation system 10 may be integrated or separated. For example, computing system 14 and its associated display 32 may be configured in truck 16 or configured external to truck in which telemetry information from radar 12 is received via communication link 36, such as a wireless communication link. Moreover, the operations of radar image generation system 10 may be performed by more, fewer, or other components. For example, radar image generation system 10 may include other signal processing components that perform various processes on return signals to generate the dynamic image. Additionally, operations of computing system 14 may be performed using any suitable logic comprising software, hardware, and/or other logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the following claims.

What is claimed is:

1. A synthetic aperture radar comprising:

a back projection processor coupled to a display and a radar configured on a truck, the back projection processor comprising instructions stored in a memory and executable on a computing system, the back projection processor operable to:

receive a plurality of return signals from the radar as the truck is moved with respect to a building, the plurality of return signals generated by the radar by stepping a transmitted radio-frequency signal from 0.5 Giga-Hertz to 2.0 Giga-Hertz, the plurality of return signals representative of electro-magnetic radiation reflected from the building;

generate a dynamic image of one or more walls of the building from the plurality of return signals by varying a squint angle of the plurality of return signals, the squint angle varied by modifying a back projection filter, the back projection filter comprising a spatial filter or a doppler filter; and display the dynamic image on the display.

2. A synthetic aperture radar comprising:

a back projection processor coupled to a radar and a display, the back projection processor comprising instructions stored in a memory and executable on a computing system, the back projection processor operable to:

receive a plurality of return signals from the radar as the radar is moved with respect to an object, the plurality of return signals representative of electro-magnetic radiation reflected from the object; and generate a dynamic image of one or more internal features of the object from the plurality of return signals by varying a squint angle of the plurality of return signals, the squint angle varied by modifying a back projection filter.

3. The synthetic aperture radar of claim 2, wherein the back projection filter comprises a spatial filter.

4. The synthetic aperture radar of claim 2, wherein the back projection filter comprises a doppler filter.

5. The synthetic aperture radar of claim 2, wherein the object comprises a building and the one or more internal features comprises one or more walls.

6. The synthetic aperture radar of claim 5, wherein the one or more walls are oriented orthogonally to a path of the radar.

7. The synthetic aperture radar of claim 2, wherein the radar is operable, to step a transmitted radio-frequency signal of the radar through a range of frequencies.

8. The mobile synthetic aperture radar of claim 7, wherein the range of frequencies extends from 0.5 Giga-Hertz to 2.0 Giga-Hertz.

9. The synthetic aperture radar of claim 2, wherein the radar is configured on a land-based vehicle.

10. The synthetic aperture radar of claim 9, wherein the land-based vehicle comprises a truck.

11. The synthetic aperture radar of claim 9, wherein the radar is oriented in a fixed orientation relative to the land-based vehicle.

12. An image generating method comprising:

receiving, by a back projection processor, a plurality of return signals from a radar as the radar is moved with respect to an object, the plurality of return signals representative of electro-magnetic radiation reflected from the object; and generating a dynamic image of one or more internal features of the object from the plurality of return signals by varying a squint angle of the plurality of return signals, the squint angle varied by modifying a back projection filter.

13. The image generating method of claim 12, wherein the squint angle is varied by modifying a spatial filter.

14. The image generating method of claim 12, wherein the squint angle is varied by modifying a doppler filter.

15. The image generating method of claim 12, wherein the object comprises a building and the one or more internal features comprises one or more walls.

16. The image generating method of claim 15, wherein the one or more walls are oriented orthogonally to a path of the radar.

17. The image generating method of claim 12, further comprising stepping a transmitted radio-frequency signal of the radar through a range of frequencies.

18. The mobile image generating method of claim 17, wherein the transmitted radio-frequency signals is stepped from 0.5 Giga-Hertz to 2.0 Giga-Hertz.

19. The image generating method of claim 12, further comprising providing the radar on a land-based vehicle.

20. The image generating method of claim 19, wherein the land-based vehicle comprises a truck.

21. The image generating method of claim 19, further comprising orienting the radar in a fixed orientation on the land-based vehicle.

* * * * *